Patented Nov. 20, 1928.

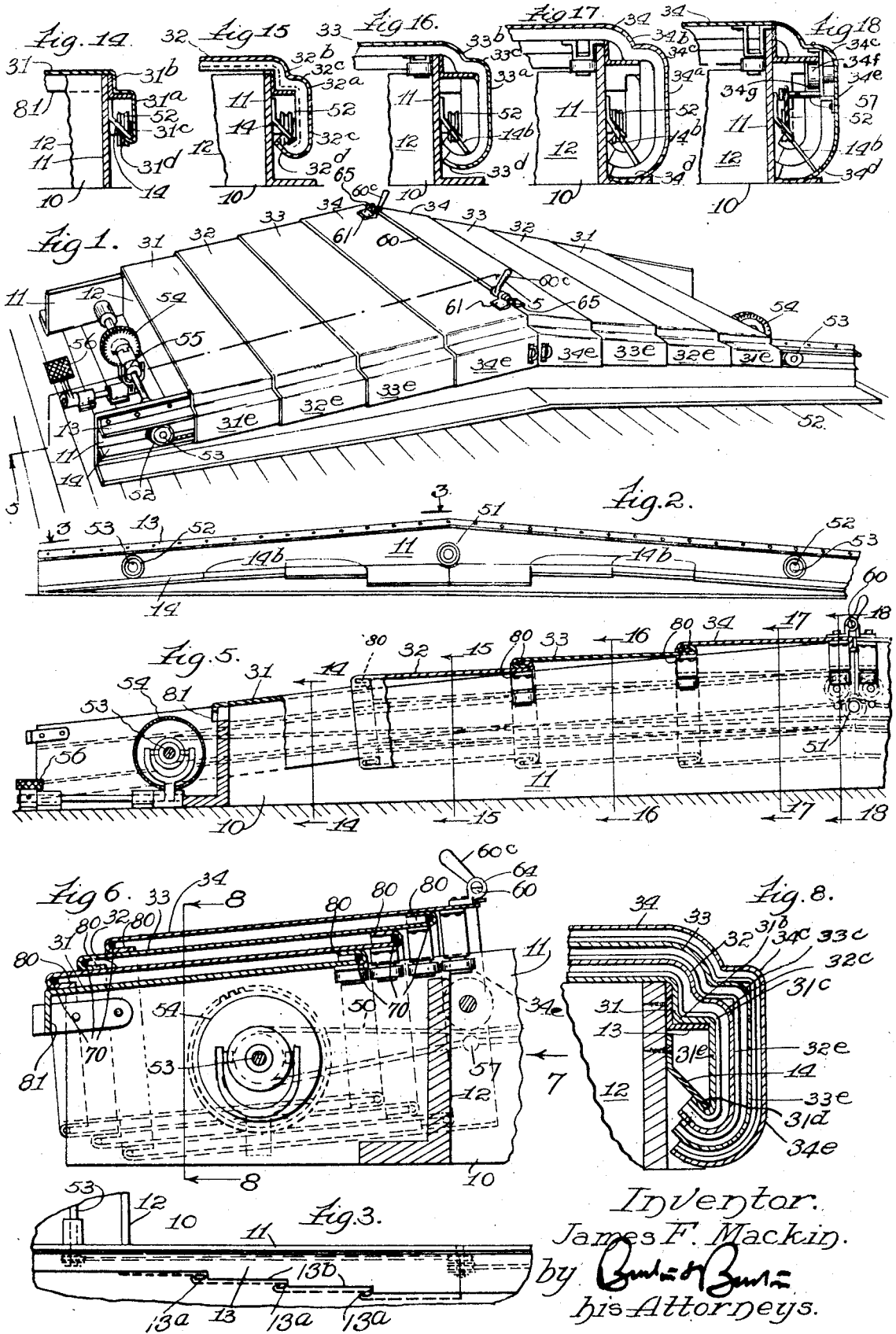

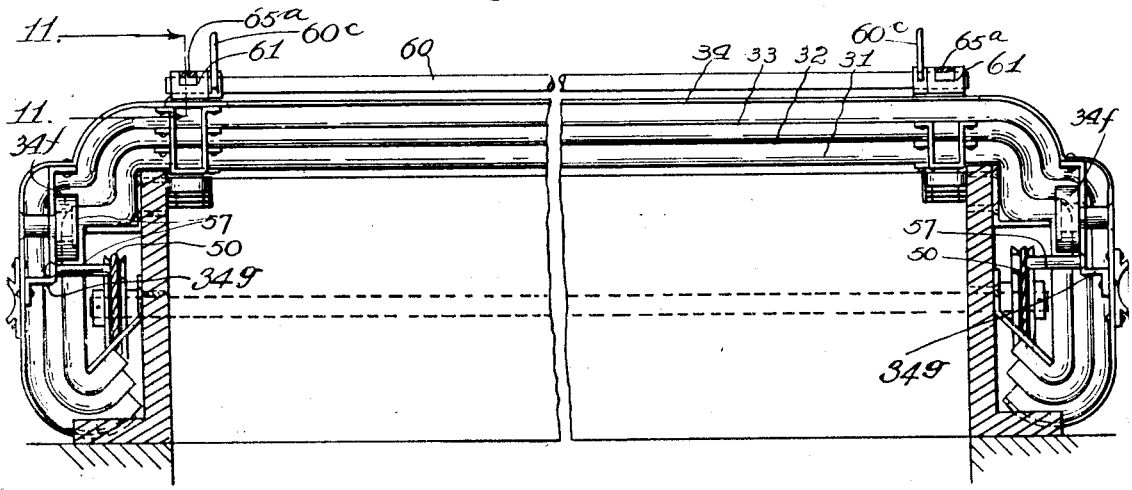
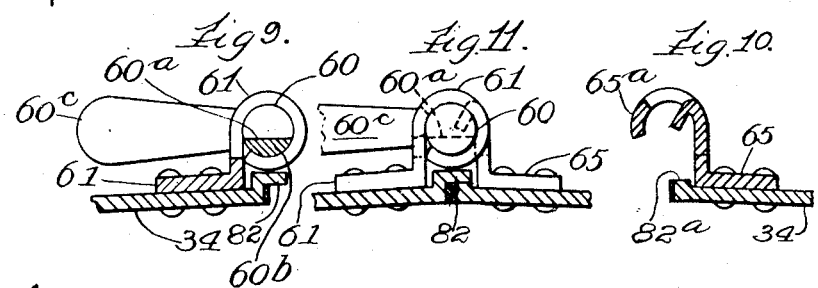
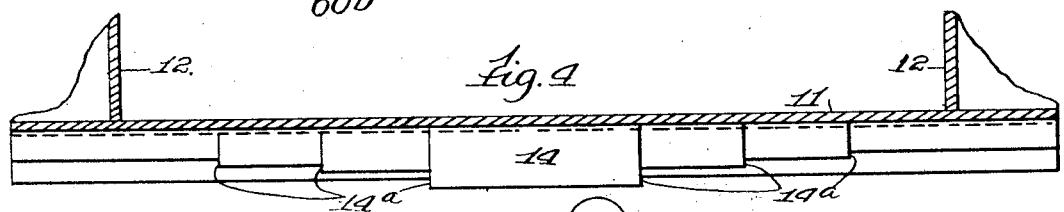
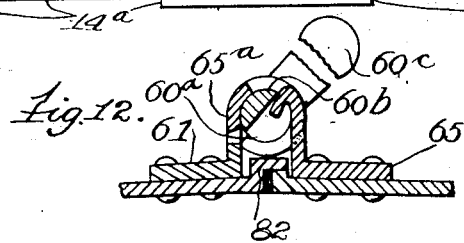
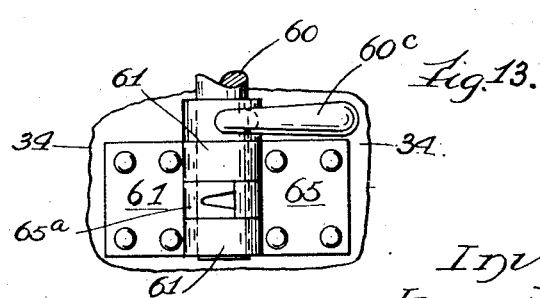

1,692,782

UNITED STATES PATENT OFFICE.

JAMES F. MACKIN, OF CHICAGO, ILLINOIS, ASSIGNOR TO CHARLOTTE K. MACKIN, OF CHICAGO, ILLINOIS.

HATCH COVER.

Application filed January 29, 1927. Serial No. 164,406.

The purpose of this invention is to provide an improved hatch cover for vessels and for use in closing floor openings in situations corresponding to those of the hatches in the deck of a sea-going vessel as in warehouse floors. It consists in the elements and features of construction shown and described as indicated in the claims.

In the drawings:—

Figure 1 is a perspective view of a portion of a vessel deck having a hatch provided with a cover embodying this invention, the same being shown at closed position of the hatch cover.

Figure 2 is an outer side elevation of the longitudinal coaming.

Figure 3 is a fragmentary detail view in plan of the stepped guide track looking in the direction indicated by the arrows, 3, 3, on Figure 2.

Figure 4 is a detail plan view of a portion of the hatch with the cover removed.

Figure 5 is a vertical section at the plane indicated by the line 5—5 on Figure 1.

Figure 6 is an enlarged vertical section taken substantially at the plane indicated by line 5—5 on Figure 1 showing the cover sections of one-half of the hatch cover in telescoped relation in hatch-opening position.

Figure 7 is a sectional elevation looking in the direction of the arrow, 7, on Figure 6, the side coaming of the hatch being shown in section transverse of the hatch opening.

Figure 8 is a section at line 8—8 on Figure 6.

Figures 9 and 10 are respectively sections of two co-operating locking members mounted on the meeting sections of the two halves of the hatch cover.

Figure 11 is a sectional view of the two lock members at their interlapped position as when the hatch covers from opposite ends of the hatch are drawn together for closing, but before said lock members are engaged for their locking function.

Figure 12 is a similar view showing the locking rod rocked into locked position.

Figure 13 is a top plan view of the device as shown in Figure 12.

Figures 14, 15, 16, 17 and 18 are detail sections at the lines 14—14, 15—15, 16—16, 17—17 and 18—18 respectively, on Figure 5.

In the drawings, the hatch opening is seen at 10, the side coaming at 11, the end coaming at 12. The hatch cover comprises two series of telescoping sections, 31, 32, 33 and 34, the number being greater or less according to the extent of the hatch or the other requirements of the particular situation. The coamings, 11, are sloped slightly widening from their opposite ends to the middle of the length of the hatch opening as usual; and on their outer sides there are mounted angle iron tracks, 13 and 14, the upper track, 13, having its projecting flange at right angles to the flange by which it is secured to the coaming, and the lower track, 14, having its projecting flange trending downward at an oblique angle of about 135° to the vertical flange by which it is secured to the coaming. The several cover sections, 31, 32, 33 and 34, each have their end portions folded down forming ends, 31ª, 32ª, 33ª, and 34ª, respectively, to embrace between their opposite ends, the opposite side coamings, 11, the lower or outer end cover section, 31, embracing said coamings directly, and the other sections, 32, 33 and 34, successively embracing each the preceding section being therefore increased in longitudinal dimension between their opposite down-folded ends an amount corresponding to the dimension transversely of the hatch opening of said embraced down-folded ends. For thus embracing the coamings the cover section, 31, is formed by folding its end portions first at right angles to the intermediate portion of its length transverse to the length of the hatch opening, said right angle bends being folded by successive right angle folds or 90° bends first at a right angle as seen at 31ᵇ, opening outwardly and upwardly, and then at a right angle opening downwardly and back inwardly as seen at 31ᶜ, said end being folded by an inwardly and upwardly facing acute angle bend, 31ᵈ, to form the depending end or flange with an outwardly projecting rib, 31ᵉ, having an inwardly facing channel, defined between the bends, 31ᵇ, and 31ᵈ, the acute angle of the last mentioned fold being about 45°, corresponding to the oblique surface of the track, 14. The sections, 32, 33 and 34 for embracing respectively each the down-folded ends of the immediately preceding section, have the outwardly and upwardly opening angles 32$^b$, 33$^b$ and 34$^b$, followed respectively by inwardly and downwardly facing angles, or 90° bends, 32$^c$, 33$^c$ and 34$^c$, embracing each the corresponding bends of the next interior section, said last mentioned bends being followed respectively by bends of more than 90° 32$^d$, 33$^d$ and 34$^d$ embracing respectively the corresponding bends of the next preceding section and forming telescoping channeled ribs, 32$^e$, 33$^e$, 34$^e$. The outer or lower longitudinal edge of the cover section, 34, the inner or upper longitudinal edges of the section, 31, and the lapped longitudinal edges of the intermediate sections, 32 or 33, are provided with hooked flanges, 80, which extend also along the edges of the down-turned ends of said sections respectively, those at the lower or outer longitudinal edges of the several sections being inturned, and those of the inner or upper longitudinal edges being out-turned, the lower longitudinal edge of section, 31, being provided with a down-turned straight flange, 81, for engaging the end coaming, 13, and the upper longitudinal edge of the cover section, 34, being provided with an up-turned plain flange, 82, for mating and forming water-tight junction with a like flange 82$^a$ of the corresponding cover section of the opposite half of the hatch.

From this description it will be understood that at closed position of the cover sections the inturned under-side hook flanges of each section engage the out-turned upper side hook flanges of the adjacent sections as seen in Figure 2. For producing watertight joint at these interlocked end flanges there are securely lodged in the bend of each hook flange a packing strip, 70, preferably made of flax fiber or like material negligibly subject to deterioration by compression or oxidation; and the parts are dimensioned so that some compression of this packing is caused in drawing the cover sections of the two series together and locking them at their meeting edges as hereinafter described. It will be understood, also, from the foregoing description, that the contiuations along the edges of the down-turned channeled end portions of said sections results in similar locking of said flanges throughout the entire continuous edges of these sections,—both the horizontal portions extending across the hatch opening and the edges of the down-turned channeled ends. The tracks, 13 and 14, are very slightly divergent from the lower ends,—at the outer ends of the hatch opening,—to the upper ends,— at the middle of the hatch opening,— where the two halves of the total cover meet, this divergence being for the purpose of causing the hatch cover sections to be free for sliding respectively upon said tracks and upon each other in the opening and closing movement, but to become quite tightly engaged and seated on said tracks at the finish of said closing movement. This slight divergence of the tracks may be seen exaggerated in Figure 2. For the same purpose, viz, facilitating the closing movement while insuring close lap and snug fit of the sections at closed position, the telescoping channeled ribs, 31$^e$, 32$^e$, 33$^e$, and 34$^e$, of the several cover sections are very slightly tapered longitudinally of the hatch, so that while they are easily drawn from assembled to extended position they become snugly engaged in the last inch or two of the extending hatch closing movement. This taper is too slight to be seen in the drawings. It will be observed, also, that in order that said tracks may constitute means for accurately positioning the several cover sections and affording them guidance in their extending and closing movement account must be taken of the successively higher position of the horizontal shoulders and the successively outward position of the vertical sides of the channel portions of the end members of said sections, due to their lapping successively upon one another; and this is provided for by forming the said tracks in what may be called horizontal steps or offsets, forming shoulders, 13$^a$, and 14$^a$, and with successive longitudinal portions stepped vertically as seen at 13$^b$, and 14$^b$.

The foregoing and following description, it will be understood, applies equally to both sides of the hatch and to both down-turned ends of the cover sections.

In view of the fact that the upper or inner meeting cover sections, 34, have no down-turned hooks for engagement with any underlying part, and are therefore to a certain extent free for upward and downward movement at said edges, it is desirable to provide some other means for checking such movement and guiding said cover sections in their initial sliding collapsing movement for telescoping with the next lower section. This is taken care of by mounting upon the inner side of the depending ends of the section, 34, brackets, 34$^g$, upon which there are mounted rollers, 34$^f$, positioned for engaging under the horizontal shoulders of the channels of the next cover section, 33, as may be seen in Figure 7.

For operating the cover sections to extend the cover to hatched position and to collapse it to open position there is provided for each half of the cover an endless flexible movement-communicating member such as a chain or cable, 50, passing around proper wheels, 51, and 52, at the middle and ends respectively of the hatch opening, either of which wheels may be connected for application of power for rotating it to drive the endless flexible member, 50. As illustrated, the driving power is applied to the wheel, 52, at the end of the hatch, said wheel being fast on a shaft, 53, extending across the hatch and journaled in the lateral coamings, on which shaft there is mounted loose for relative rotation a worm wheel, 54, adapted to be driven by a worm (not shown) connected with reversible driving means, (not shown), and adapted to be clutched to the shaft, 53, by a clutch sleeve, 55, on said shaft arranged to be operated by a clutch pedal, 56, requiring no further description. The endless flexible driving member, 50, is attached to the outer section, 34, of the telescoped cover sections as indicated at 57, which is a stop projecting inward from the bracket, 34$^g$, above mentioned, mounted for carrying the roller, 34$^f$. At their open positions all the cover sections are telescoped together as seen in Figure 6, and when the hatch is to be closed, power being applied to rotate the worm wheel, 52, in the proper direction, the shaft, 53, being clutched to said wheel, the upper ply of the cable carries the cover section, 34, inward until its in-turned hook flange, 80, engages the out-turned hook flange, 80, of the next cover section, 33, and draws the latter in closing direction until its inturned hook 80, engages the out-turned hook flange, 80, of the cover section, 32, which in turn and in like manner engages and draws the last section, 31, for drawing its down-turned flange, 80, tightly against the end coaming, 1, by the time the first section, 34, is at closed position ready to be locked to the corresponding section, 34, of the other half of the cover, which will have been or may be similarly operated for closing.

For locking together water-tight at their meeting edges the co-operating sections, 34, drawn thus together from opposite ends of the hatch, any convenient form of locking device may be provided. The drawing shows in Figures 9, 10, 11, 12 and 13 a simple and conveniently operated lock consisting of a shaft, 60, journaled at each end in forked brackets, 61, 61, on one of the cover sections, 34, the shaft having its ends which protrude beyond the inner fork members of the brackets cut away at one side, reducing it in cross section to somewhat less than a 180° segment, as seen at 60$^a$. The other cover section, 34, is provided with co-operating brackets, 65, 65, which are mounted in position to project between the fork members of the bracket, 61, at the closed-together position of the two cover sections, 34, the brackets, 65, having each an overhanging substantially semi-circular downwardly-open terminal, 65$^a$, registering as to its position of arcuate form at closed-together position of the cover sections with the circular journal bearing on the bracket, 61, of the locking shaft, 60, whose segment end, 60$^b$, at unlocked position is at the lower side, and therefore in position to enter under the overhanging terminal, 65$^a$, of the bracket, 65, seen in Figure 10; whereupon the shaft, 60, being rocked by means of its operating handle, 60$^c$, through an angle of 90° or more, the segments, 60$^b$, are engaged under the overhanging terminal, 65$^a$, of the bracket, 65, and the sections of both halves of the cover are clamped tightly together at their interlocking hook flanges and in water-tight contact of the sections, 34, at their meeting edges and water-tight contact of the flanges, 81, of the outer sections, 31, with the end coamings, 12.

It will be observed that the wheels about which the propelling chain or cable, 50, passes being outside the coaming, are close enough thereto to be overhung and enclosed by the down-turned ends of the lowest and innermost of the cover sections, 31, and this being in turn overhung by the next, and that by the third and so on to the uppermost and outermost section, the wheels and both plies of the chain or cable are enclosed between the coaming and the downturned ends of the cover section at the closed position of the latter, so that the wheels and endless propeller are protected from the water, which it is the purpose of the cover section with the packed interlocked hook edges to exclude from the hatch.

I claim:—

1. Closing means for hatches and like floor openings, comprising in combination with a hatch coaming a plurality of cover sections mounted for sliding on the coaming successively overlapping one another longitudinally of the hatch, said lapping edges having hook flanges adapted to interlock at closed position of the cover sections, and means interposed in the hook flanges for water-tight interlocking of said hook flanges of the consecutive cover sections.

2. In the construction defined in claim 1, the cover sections having down-turned ends for embracing between them both the opposite sides of the coaming, the hook flanges extending throughout the edges of said down-turned ends which are continuous with the horizontal edges of the sections having said hook flanges.

3. In the construction defined in claim 1, the cover sections having down-turned ends, the section at one end of the series being dimensioned for embracing between its said down-turned ends both the opposite sides of the coaming, and the remaining sections of the series being dimensioned respectively for embracing between their down-turned ends the down-turned ends of the next preceding section of the series; two guide tracks mounted one above the other upon the outer sides of the side coamings, the down-turned ends of said cover section having means for engaging above and below said tracks respectively, said tracks being stepped so as to comprise successive portions at different levels corresponding to the levels of the engaging means of said down-turned ends of the several cover sections respectively at hatch-closing position.

4. In the construction defined in claim 1, the cover sections having down-turned ends, the section at one end of the series being dimensioned for embracing between their down-turned ends the down-turned ends of the next preceding section of the series; two guide tracks mounted one above the other upon the outer sides of the side coamings having successive portions of their length of width increasing successively from the end of the hatch at which the covers are assembled at open position to the point of extension at closed position correspondingly to the different distances of the down-turned ends of the hatch covers respectively from the coaming, due to their successively increasing dimensions for embracing one another.

5. Closing means for hatches and like floor openings comprising in combination with a hatch coaming a plurality of cover sections mounted for sliding on the coaming successively overlapping one another longitudinally of the hatch, said cover sections having down-turned ends for embracing between them both opposite sides of the coaming, the lapping edges of the adjacent sections having return-bend hook flanges adapted to interlock by hooking into each other at closed position of the cover section, said hook flanges extending throughout the edges of said adjacent sections and being continuous with the longitudinal sections having said hook flanges.

6. Closing means for hatches and like floor openings comprising in combination with a hatch coaming a plurality of cover sections mounted for sliding on the coaming successively overlapping one another longitudinally of the hatch, said cover sections having down-turned ends for embracing between them the opposite sides of the coaming, two guide tracks mounted one above the other upon the outer sides of said coaming, the down-turned ends of the innermost of said lapping cover sections having means for engaging above and below said tracks respectively, and the successive cover sections having respectively similar means for engaging above and below the next preceding cover sections, said two guide tracks being slightly divergent from the outer end to the middle of the hatch, whereby in the extension of the cover to closing position, said covers become successively clamped upon each other and upon the guide tracks.

7. Closing means for hatches and like floor openings comprising in combination with a hatch coaming a plurality of cover sections mounted for sliding on the coaming successively overlapping one another longitudinally of the hatch, said cover sections having down-turned ends for embracing between them both the opposite sides of the coaming, means for propelling the cover sections from open position in hatch-closing direction, said means extending the length of the successively lapped series of cover sections, means actuating said propelling means positively connected with the last outer-lapped cover section, and actuating means for said propelling means engaged therewith at the end of the series of cover sections at which they are assembled in open position, the propelling means consisting of an endless power transmission member, and driving and carrying wheels about which it travels, said wheels being mounted for rotation outside the coaming, and said endless power transmitting member extending outside the coaming and inside said down-turned ends of the cover sections.

In testimony whereof, I have hereunto set my hand at Chicago, Illinois, this 25th day of January, 1927.

JAMES F. MACKIN.